United States Patent [19]
Fouquet et al.

[11] Patent Number: 5,593,183
[45] Date of Patent: Jan. 14, 1997

[54] ENERGY-ABSORBING DEVICE FOR VEHICLE STEERING COLUMN

[75] Inventors: Jean-Michel Fouquet; Benoit Duval, both of Vendome, France

[73] Assignee: NACAM, Vendome, France

[21] Appl. No.: 368,992

[22] Filed: Jan. 5, 1995

[30] Foreign Application Priority Data

Jan. 6, 1994 [FR] France .................................. 94 00087

[51] Int. Cl.⁶ ...................................................... B62D 1/19
[52] U.S. Cl. .............................. 280/775; 280/777; 74/493
[58] Field of Search ..................................... 280/775, 777; 74/493, 492

[56] References Cited

U.S. PATENT DOCUMENTS

| | | | |
|---|---|---|---|
| 2,779,208 | 1/1957 | Pittman et al. | 74/493 |
| 4,901,592 | 2/1990 | Ito et al. | 280/777 |
| 4,998,999 | 3/1991 | Yuzuriha et al. | 280/777 |
| 5,113,716 | 5/1992 | Dumschat et al. | 280/775 |
| 5,378,021 | 1/1995 | Yamaguchi et al. | 280/777 |

FOREIGN PATENT DOCUMENTS

| | | |
|---|---|---|
| 0424629A1 | 5/1991 | European Pat. Off. . |
| 0557767 | 9/1993 | European Pat. Off. . |
| 4118863C1 | 9/1992 | Germany . |
| 2116496 | 9/1983 | United Kingdom . |

*Primary Examiner*—Brian L. Johnson
*Assistant Examiner*—Peter C. English
*Attorney, Agent, or Firm*—Emmanuel J. Lobato; Burns & Lobato, P.C.

[57] ABSTRACT

An energy-absorbing device for an automobile steering column adjustable in depth and/or inclination mounted on a support structure fixed to the vehicle body. The body-tube and steering shaft are received in the support structure and clamped and locked therein by clamping elements coactive with the support structure. A locking device is provided with a rotatable elongate locking element to which is connected an operator for rotating the axis of the locking element in a direction for clamping the body-tube between coacting clamping elements and vertical sides of the support structure. The locking element is a bolt or rod having reverse pitch nuts on opposite ends and which tighten the sides of the support structure and clamping elements toward the body-tube to lock the body-tube in place when the locking element axis is rotated by the locking device operator. Provision is made in parts of the support structure and clamping elements for depth adjustment and inclination of the steering column body-tube by providing in the support structure and clamping elements slots that allow positioning of the locking element axis at a selected position in accordance with the selected depth and inclination of the body-tube. An energy-absorbing device is provided in the form of a hydraulic shock absorber the body or cylinder of which is fixed to an end of the body-tube facing the vehicle steering wheel so that an impact force applied at that end and which is parallel to the longitudinal axis of the body-tube effects axial translation of the body-tube relative to the support structure. An intermediate element of the locking device connects a piston of the shock absorber to the locking device operator which rotates the axis of the elongate locking element in a direction for tightening the body-tube in the support structure as the body-tube translates. The locking element thus preliminarily tightens the support structure and clamping elements in response to the body-tube translation. If the impact force reaches the value of the tightening or clamping forces the damping device is rendered effective and absorbs the energy of the impact force.

9 Claims, 4 Drawing Sheets

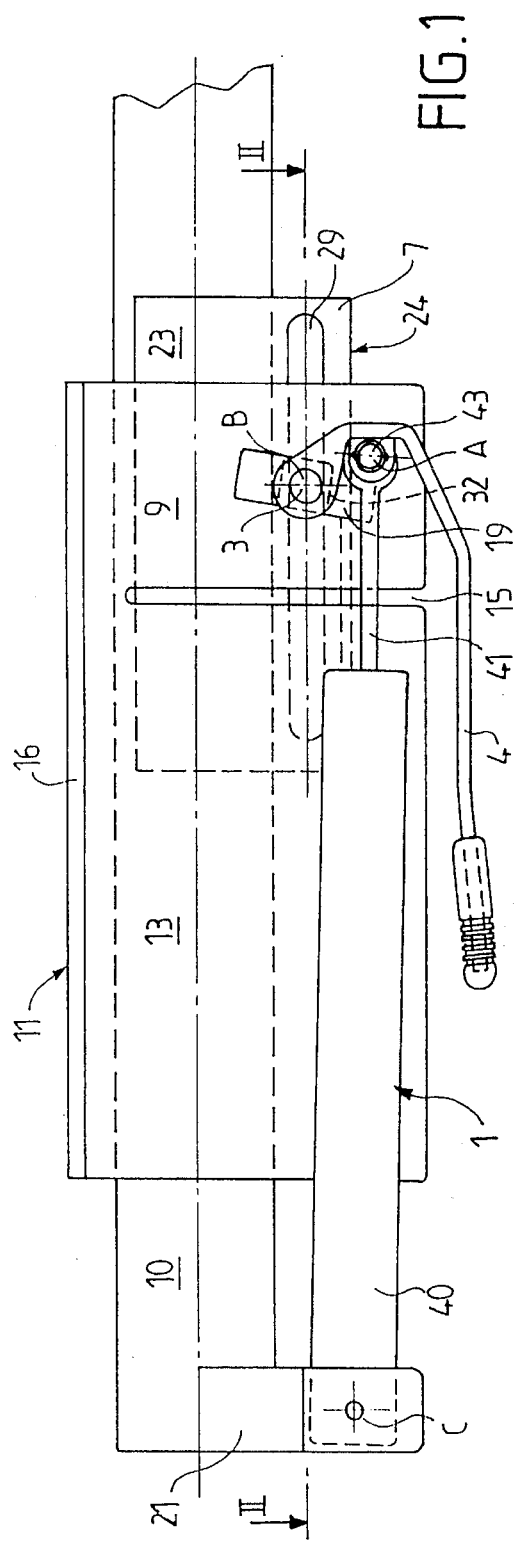
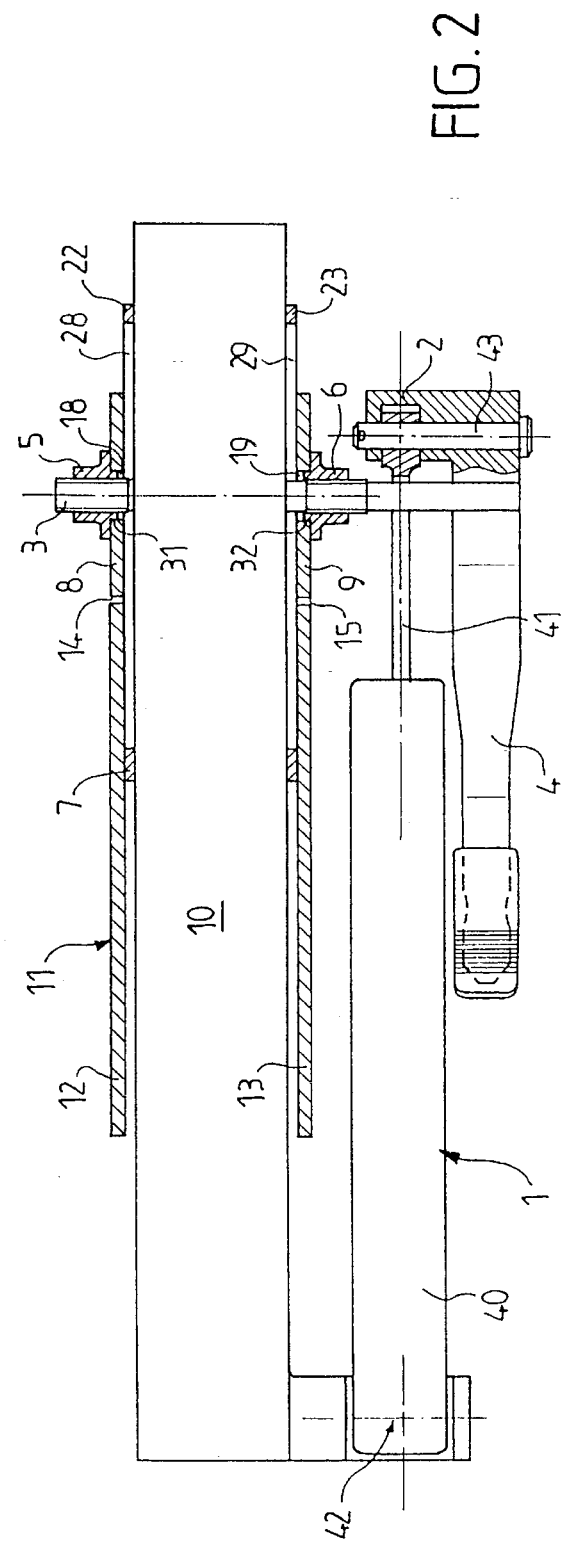

ENERGY-ABSORBING DEVICE FOR VEHICLE STEERING COLUMN

This invention relates to an energy-absorbing device for an automobile vehicle steering column adjustable in depth and/or in inclination, and whose steering shaft is mounted in a body-tube that is supported and locked to the vehicle body in the desired position.

Many energy-absorbing devices are known that can be adapted to automobile vehicle steering columns whose depth and/or inclination cannot be adjusted. The problem is more difficult with steering columns that can be adjusted in either depth or inclination, or in both directions. Furthermore, known devices are unable to absorb a predetermined force of constant value irrespective of adjustment position. In addition, at the time of an impact, these devices do not maintain the steering column at the same angular adjustment it had prior to the impact.

SUMMARY OF THE INVENTION

The object of the invention is to provide an energy-absorbing system for automobile vehicle steering columns adjustable in depth and/or inclination, and which is able to absorb a predetermined force applied to the driver's steering point, and to do this irrespective of the adjustment position, while at the same time maintaining the steering column at the same angular adjustment it had prior to the impact.

According to the invention, the energy-absorbing device adapts to an automobile vehicle steering column that is adjustable in depth and/or inclination, the steering shaft of which is mounted in a body-tube and supported and locked to the vehicle body in the desired position.

This device comprises:
- a support fixed to the vehicle body and receiving the body-tube,
- a system for locking the body-tube in the support, the locking axis of which is perpendicular to the steering column axis, the locking system acting by rotation about the locking axis by means of an operating device,
- a depth adjustment system working with the locking system,
- an inclination adjustment system working with the locking system,
- a damping system arranged between the body-tube and the locking system, and acting in a direction substantially parallel to the steering column axis,
- the damping system is connected, on the one hand:
  to one of the ends of the body-tube, and on the other hand,
  to the support by means of an intermediate element,
- the intermediate element and damping system are arranged in such a way that in the event of an impact, the damping system is first of all neutralized and simultaneously drives the intermediate element which provides supplemental tightening, up to a point where the force to be absorbed by the damping system is reached, the damping system then acts as an energy-absorbing means.

According to one particular embodiment of the invention, the steering shaft is assembled in the body-tube in a known manner by means of a reinforcement part, in which case the system for locking the body-tube in the support comprises advantageously:
- a tightening bolt traversing two tightening brackets made on each of the vertical members of the support, and the two vertical members of the reinforcement part of the body-tube,
- two reverse-pitch nuts mounted on each end of the tightening bolt on the outside of each respective tightening bracket, and with respect to which they are locked in rotation,
- an operating device mounted on one end of the tightening bolt,
- such that the desired locking is produced by turning the operating device in the desired direction about the locking axis.

To make the most of this architecture, the depth adjustment system comprises an elongated hole made in each of the vertical members of the reinforcement part, each elongated hole being substantially parallel to the axis of the steering column and slightly wider than the diameter of the tightening bolt, such that said tightening bolt can traverse and slide easily in each of these elongated holes.

Preferably, the inclination adjustment system comprises an elongated hole made in each bracket of the support in a direction that is fractionally inclined with respect to the perpendicular to the steering column axis, said elongated hole being fractionally wider than the square of each of the corresponding nuts, such that the tightening bolt can slide with its nuts in each of these elongated holes, while ensuring the locking in rotation of the nuts.

According to another embodiment, the depth adjustment system comprises an elongated hole made in each bracket of the support, said elongated hole being fractionally wider than the square of each of the corresponding nuts, such that the tightening bolt can slide with its nuts in each of these elongated holes, while ensuring the locking in rotation of the nuts. According to another embodiment, the inclination adjustment system comprises an elongated hole made in each vertical member of the reinforcement part, said elongated hole being fractionally wider than the diameter of the tightening bolt, such that the latter can traverse and slide easily in each of these elongated holes.

According to different embodiments of the invention, the damping system can be mounted either outside or inside the support.

According to a particularly interesting embodiment of the invention, the damping system is a hydraulic shock absorber. Advantageously in this type of arrangement:
- the hydraulic shock absorber works in compression and is arranged outside the support,
- the body of the shock absorber is connected to the end of the body-tube facing the driver's wheel,
- the piston rod of the shock absorber is connected to the operating device by an intermediate element made up of a link arm that, on the one hand, is rigidly locked to the operating device, and on the other hand, articulates at the end of the piston rod by means of an articulation, the distance between the articulation and the locking axis forming a lever about the locking axis, which acts in the same direction as the operating device, in such a way as to provide the supplemental tightening.

In the embodiment of the invention described above, it is particularly interesting to connect the hydraulic shock absorber to the body-tube by means of a fork-type articulation. In the same way, the articulation of the end of the piston rod with the link arm of the operating device is a fork.

According to a modified embodiment of the invention, a plate is mounted on each side of the body-tube and to which it is rigidly locked, each of these plates being arranged in place of the body-tube.

According to the invention, the absorption of energy due to an impact on a steering wheel that is adjustable in depth and/or inclination, the steering shaft of which is mounted in a body-tube supported and locked onto the vehicle body in the desired position, involves the following phases:

induction, under the effect of the impact, of a force along the steering axis at a considerable speed, sliding of the body-tube in the support fixed to the vehicle body, under the action of the force via the depth adjustment system working with the system for locking the body-tube in the support, displacement of the damping system connected at one end to the body-tube, which effects the sliding, and, at the other end, to the operating device of the locking system acting by rotation about the locking axis, rotation of the operating device which turns in the locking direction due to the displacement of the damping system during the end of the distance of travel of the depth adjustment, the center-to-center distance of the ends of the damping system thus remaining substantially constant, when the impact force exceeds the force the damping system is to absorb, said system then travels the full energy absorbing distance of travel.

If the vehicle is equipped with a bag means that instantaneously inflates on impact, known as an "air-bag", the force exerted by the driver's body on the steering wheel is transmitted via the air-bag.

According to another embodiment of the invention:

the hydraulic shock absorber works in compression and is arranged outside the support, the body of the shock absorber is supported by the body-tube on the driver's wheel side, the piston rod of the shock absorber is connected to the operating device by a link arm which is, on the one hand, rigidly locked with the operating device, and on the one hand, articulating at the end of the piston rod by an articulation, the distance between the articulation and the locking axis forming a lever about the locking axis, which acts in the same direction as the operating device, in such a way as to provide the supplemental tightening.

According to another embodiment of the invention:

the system for locking the body-tube in the support is made up of a tightening rod traversing the two tightening brackets provided on each vertical member of the support, a cam system is mounted on the outside of one of the vertical members, at the end of the tightening rod, an axial holding means is mounted on the outside of the other vertical member on the other end of the tightening rod, an operating device is mounted on the cam system, in such a way that by turning the operating device in the desired direction about the locking axis, the cam system ensures the desired locking.

In this embodiment, the system providing supplemental tightening can be a cam system, which is mounted on the outside of the vertical member and held by a nut.

According to another embodiment of the invention:

the hydraulic shock absorber works in compression and is arranged inside the support, the body of the shock absorber is connected to the end of the body-tube facing the driver's wheel, the end of the shock absorber's piston rod is provided with a passage hole for a part mounted in each of the tightening brackets, said part carrying at each of its threaded ends, a nut to lock the rod, said part forming the intermediate element, which in the event of an impact, gives the supplemental tightening by its deformation under bending, which brings the tightening brackets closer to each other.

According to another embodiment, the device of the invention can comprise a device for holding the body-tube in position made up of two tightening Vs each arranged between one of the vertical members of the body-tube, with the two faces of the V bearing against the body-tube, in such a way that when the depth or inclination adjustment is made, each V follows the movement of the body tube by sliding along the bearing wall of the corresponding tightening bracket.

Advantageously in this embodiment, an angular guide system is provided for each tightening V in the corresponding vertical member. This angular guide system comprises a pin carried by the outer face of each of the tightening Vs, which penetrates and slides in a slot made in the corresponding tightening bracket. Each slot is inclined with respect to the steering column axis in such a way as to be substantially parallel to the trajectory of the driver's body at the time of an impact. The shape and inclination of the slots can be chosen after impact tests have been carried out on dummies.

To further improve this embodiment, a system is provided that prevents the body-tube rotating about its axis. This anti-rotation system consists of a plate fixed below the body-tube and comprises two wings arranged parallel to each vertical member or tightening bracket, the distance between the outer faces being slightly less than the spacing of the bearing walls of the tightening brackets. Furthermore, the wings of the plate of the anti-rotation system are traversed by the axis of the locking system. Another anti-rotation system consists of a central element fixed under the body-tube, said central element being traversed by the axis of the locking system.

Operation with a column equipped with an air-bag makes it possible to improve the holding of the column in the angular direction before the driver strikes the wheel.

The device can also function without an air-bag, in which case it is the force due to the driver striking the wheel that causes the body-tube to slide and activate the device.

The energy-absorbing device for automobile vehicle steering columns adjustable in depth and/or inclination, according to the invention, therefore has the advantage of absorbing the same force applied to the driving point whatever the adjustment position. In addition, this device retains the column's angular adjustment at the time of an impact. This device also has the advantage of being activated when the air-bag is triggered or by the force applied to the steering wheel when the driver strikes it. Furthermore, energy is absorbed starting from a small displacement of the column tube whatever the adjustment position of the steering wheel. Finally, the system is self-tightening, which enhances the steering column's position holding characteristics in the axial and angular directions.

BRIEF DESCRIPTION OF THE DRAWING

A number of embodiments of the invention will now be described by means of non-limiting examples which must be read in conjunction with the attached drawings. In these drawings:

FIG. 1 is a longitudinal view in the axial direction of the steering column with an energy-absorbing device of the invention.

FIG. 2 is a half-section along line II—II of FIG. 1 and shows an external view from above of the body-tube.

DESCRIPTION OF THE PREFERRED EMBODIMENTS

As can be seen in FIGS. 1 and 2, the energy-absorbing device of the invention mounts on an automobile vehicle steering column adjustable in depth and/or inclination. The steering shaft of this steering column is mounted in a body-tube 10 which is supported and locked to the vehicle body in the desired position.

The energy-absorbing device essentially comprises:

a support 11 which is fixed to the vehicle body and receives body-tube 10, a system for locking body-tube 10 in support 11, the locking axis being perpendicular to the steering column axis, and the locking system being operated by means of an operating device 4, a depth adjustment system which works with the locking system, an inclination adjustment system which works with the locking system, a damping system arranged between body-tube 10 and the locking system, and which acts in a direction substantially parallel to the steering column, the damping system being connected on the one hand:
  to one end of body-tube 10, and on the other hand,
  to support 11 by means of an intermediate element, the intermediate element and the damping system being arranged in such a way that in the event of an impact, the damping system is first of all neutralized and simultaneously drives the intermediate element which provides supplemental tightening, up to a point where the force to be absorbed by the damping system is reached, the damping system then acting as an energy-absorbing system.

Figure 4:
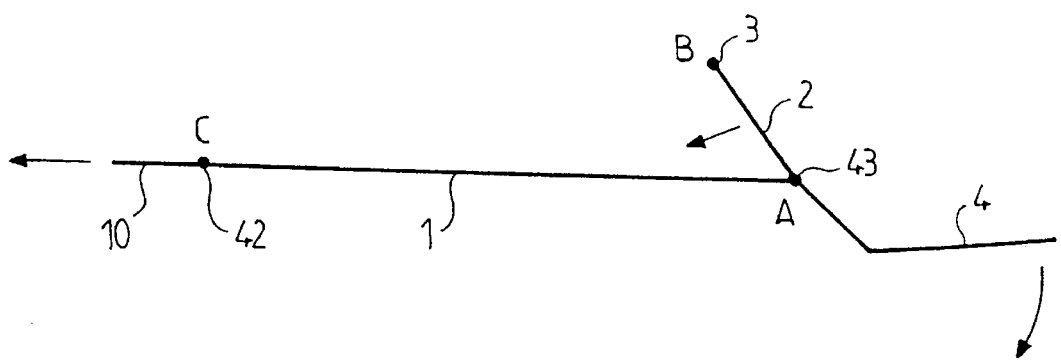
FIG. 4 is a schematic view of the link between the body-tube, shock absorber and operating device.

In the case of FIGS. 1, 2 and 4, the damping system is made up of a hydraulic shock absorber 1 arranged between the body-tube and operating device 4, which acts in a direction substantially parallel to the axis of the steering column, and which is connected, on the one hand:

to the end of body-tube 10 facing the driver's wheel, and on the other hand, to the operating device by means of an articulation referenced 43.

Rod 41 of the piston of hydraulic absorber 1 is connected to the operating device 4 by means of the intermediate element formed by link arm 2. This link arm 2 is, on the one hand, rigidly locked to operating device 4, and on the other hand articulates at the end of piston rod 41 by means of an articulation 43. The distance between articulation 43 and the locking axis forms a lever about the locking axis, which operates in the same direction as operating device 4 in such a way as to effect the supplemental tightening.

This has been shown in FIG. 4, where the locking axis is represented by point B and articulation 43 by point A, the distance A-B forming the lever which acts in the same direction as operating device 4.

As can be seen in FIGS. 1 and 2, the support 11 is made up of two vertical members referenced 12 and 13 which are connected to each other by means of an upper connecting element 16. Furthermore, the provision of two cut-outs referenced 14 and 15 on each of these vertical members, respectively 12 and 13, makes it possible to provide a tightening bracket 8 on vertical member 12 and a tightening bracket 9 on vertical member 13. Finally, elongated holes 18 and 19 are provided in each of the tightening brackets 8 and 9, respectively. These elongated holes 18 and 19 are intended to receive the locking system and to allow adjustment of the inclination.

According to one particular embodiment, body-tube 10 comprises a reinforcement part 7 made up of two vertical members referenced 22 and 23 which are connected to each other by means of a lower connecting element 24. This reinforcement part 7 is welded onto body-tube 10. Furthermore, each of the vertical uprights 22 and 23 comprises an elongated hole referenced 28 and 29. These elongated holes 28 and 29 are intended to receive the locking system, and to allow adjustment of the depth of the steering column. Finally, a support element 21 is fitted to the end of body-tube 10 facing the driver's wheel.

The system for locking body-tube 10 in support 11 is made up of a tightening bolt 3, two reverse-pitch nuts 5 and 6, and the operating device 4.

Tightening bolt 3 traverses the two tightening brackets 8 and 9 provided on each vertical member 12 and 13 of support 11. Tightening bolt 3 also traverses the two vertical members 22 and 23 of strengthening square 7 of tube 10 mounted inside the two vertical members 12 and 13 of support 11.

The two reverse-pitch nuts 5 and 6 are mounted on each end of the tightening bolt 3. Each of these nuts 5 and 6 is mounted, respectively, on the outside of each tightening bracket 8 and 9, with respect to which it is locked in rotation. For this purpose, each of the nuts 5 and 6 has a square referenced respectively 31 and 32, which engages in the corresponding elongated hole 18 and 19 provided in each of the tightening brackets 8 and 9.

The operating device 4 is mounted at one of the ends of tightening bolt 3, which in the case of FIGS. 1 and 2 is located outside of nut 6. It is therefore possible by turning operating device 4 in the desired direction about the locking axis, which is that indicated by the arrow shown in FIGS. 1 and 4, to ensure the desired locking by bringing tightening brackets 8 and 9 towards and tightening them against vertical members 22 and 23 of the reinforcement part 7 of body-tube 10.

The depth adjustment system is made up of elongated holes 28 and 29 which are provided in each of the vertical members 22 and 23 of strengthening square 7. Each of these elongated holes 28 and 29 is substantially parallel to the steering column axis, and is fractionally wider than the diameter of tightening bolt 3, such that tightening bolt 3 is able to traverse and slide easily in each of these elongated holes 28 and 29.

The inclination adjustment system is made up of elongated holes 18 and 19 provided in each of the brackets 8 and 9 of support 11. The direction of each of these elongated holes 18 and 19 is such that it is possible to adjust the angular position of the steering column. Furthermore, these elongated holes 18 and 19 are fractionally wider than square 31 and 32 of each of the corresponding nuts 5 and 6, such that tightening bolt 3 can slide with the nuts 5 and 6 in each of these elongated holes 18 and 19 while ensuring the locking in rotation of said nuts 5 and 6.

Hydraulic shock absorber 1 is arranged outside support 11. In the embodiment shown in FIGS. 1, 2 and 4, hydraulic shock absorber 1 works in compression. Hydraulic shock absorber 1 has a body 40 which is connected to the end of body-tube 10 facing the driver's wheel. Body 40 is thus connected to support element 21 of body-tube 10 by means of a fork-type articulation 42.

Rod 41 of the piston of hydraulic shock absorber 1 is connected to operating device 4 by means of a link arm 2. This link arm 2 is, on, the one hand, rigidly locked to operating device 4, and on the other hand articulates at the end of piston rod 41 of hydraulic shock absorber 1 by means of an articulation 43. In the case of the embodiment shown in the Figures, this articulation 43 is a fork.

Without leaving the scope of the invention, the damping system can be mounted inside support 11, and it can be arranged to work in traction or compression, irrespective of whether it is mounted inside or outside support 11.

According to another embodiment of the invention which is not shown in the Figures, a plate is mounted on each side of body-tube 10 and rigidly locked to it. Each plate takes the place of each of the body-tube's vertical members, such that each of the tightening brackets 8 and 9 of support 11 can come to bear and clamp against each of these plates.

Figure 3:
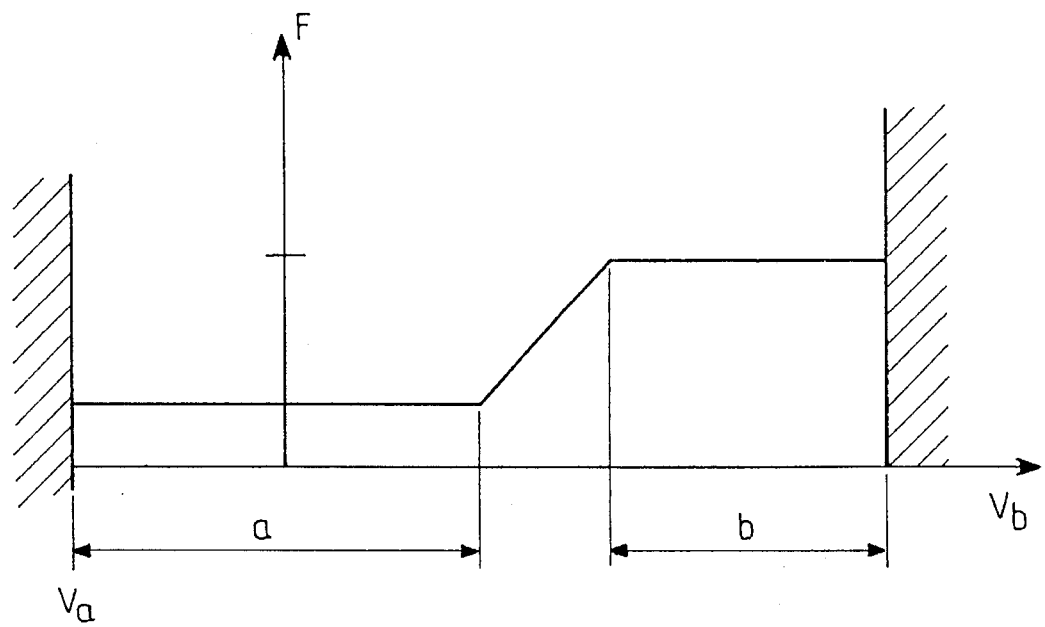
FIG. 3 is a variation curve of the hydraulic shock absorber showing the value of the traction force as a function of retraction speed.

The traction force curve of hydraulic shock absorber 1 as a function of retraction speed is shown in FIG. 3. At low speed, i.e. in zone a, which corresponds to the adjustment of the column, there is a low resisting force F. At the high retraction speed V, which corresponds to the moment of impact, the resisting force is fixed, whatever the speed of retraction, this being represented in zone b.

The length of elongated holes 28 and 29 provided in vertical members 22 and 23 of reinforcement part 7 is such that elongated holes 28 and 29 allow adjustment of the depth as well as an energy-absorbing distance of travel. Furthermore, a removable clip-on end stop, not shown in the Figures, limits the steering column adjustment to the distance of travel of the depth adjustment at the time of normal working.

Figure 5:
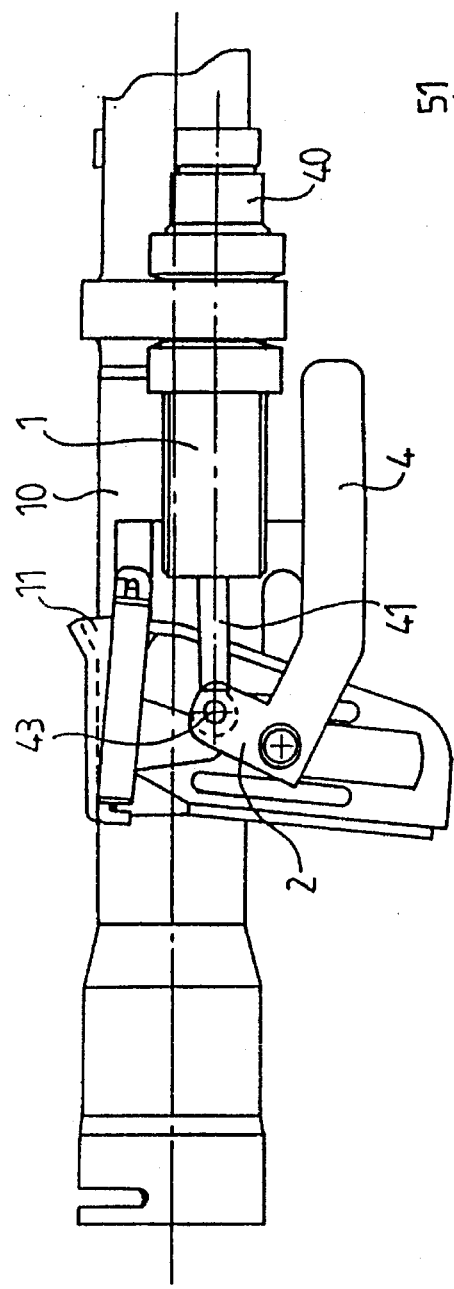
FIG. 5 is a similar view to that shown in FIG. 1 of another embodiment of the invention.

The energy absorbing device of the invention shown in FIG. 5 comprises a hydraulic shock absorber 1, which works in compression, and which is arranged outside of support 11. Body 40 of this hydraulic shock absorber 1 is supported on the driver's wheel side by body-tube 10. Piston rod 41 of hydraulic shock absorber 1 is connected to operating device 4 by means of a link arm 2 which is on the one hand rigidly locked to operating device 4, and on the other hand able to articulate at the end of piston rod 41 by means of an articulation 43. The distance between articulation 43 and the locking axis forms a lever which turns about the locking axis and acts in the same direction as the operating device in such a way as to provide supplemental tightening.

Figure 7:
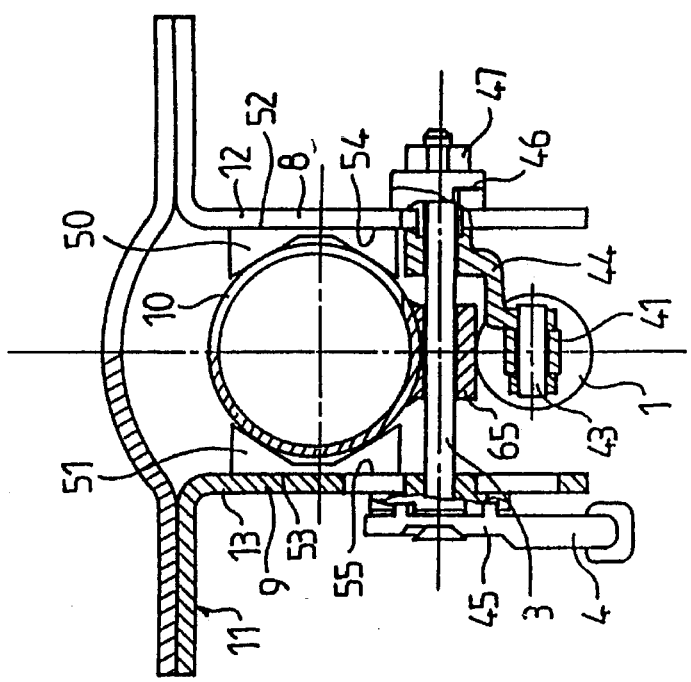
FIG. 7 is a transversal cross-section along line VII—VII of FIG. 6.
Figure 6:
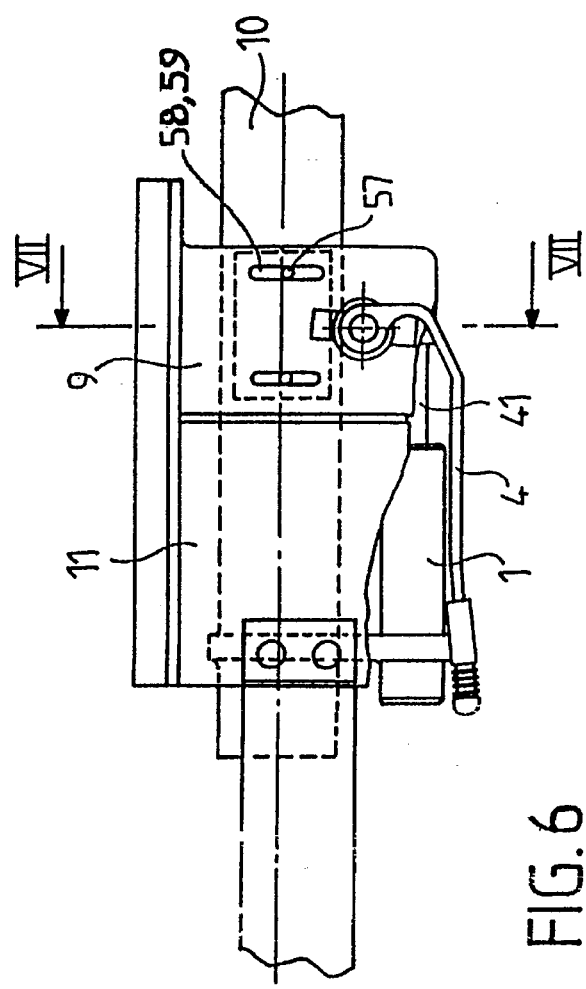
FIG. 6 is a similar view to that shown in FIG. 1 of a further embodiment of the invention.
Figure 8:
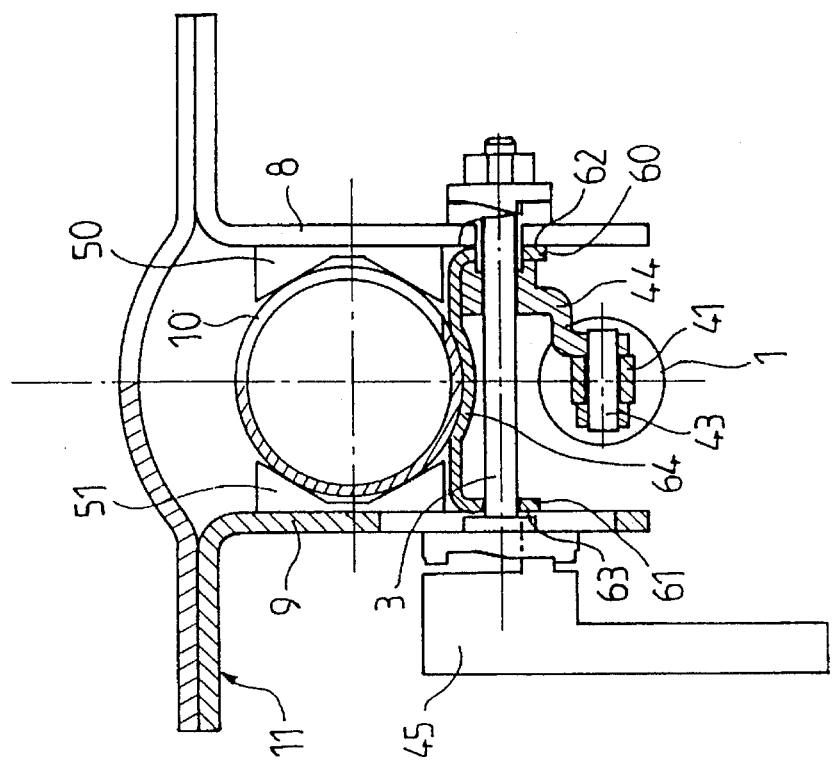
FIG. 8 is a similar view to FIG. 7 of a modified embodiment.

According to one embodiment shown in FIGS. 6, 7 and 8, the system for locking body-tube 10 in support 11 is made up of a tightening rod traversing the two tightening brackets 8 and 9 made on each of the vertical members 12 and 13 of support 11. This locking system comprises a cam system 45 mounted on the outside of one of the vertical members 13 and at the end of tightening rod 3. A axial holding means is mounted on the outside of the other vertical member 12 on the other end of the tightening rod 3. An operating device 4 is mounted on the cam system 45 in such a way that by turning the operating device 4 in the desired direction about the locking axis, the cam system 45 provides the desired locking.

According to this embodiment of the invention shown in FIGS. 6 to 8, hydraulic shock absorber 1 works in compression and is arranged inside support 11. Body 40 of hydraulic shock absorber 1 is connected to the end of body-tube 10 facing the driver's wheel. Piston rod 41 of hydraulic shock absorber 1 is connected to a lever 44, on the one hand mounted and turning about the locking axis, and on the other hand able to articulate at the end of piston rod 41 by means of an articulation 43. Lever 44 is the intermediate element commanding the supplemental tightening system. In the case of the Figures, the supplemental tightening system is a cam system 46 mounted on the outside of vertical member 12 and held by a nut 47.

Figure 9:
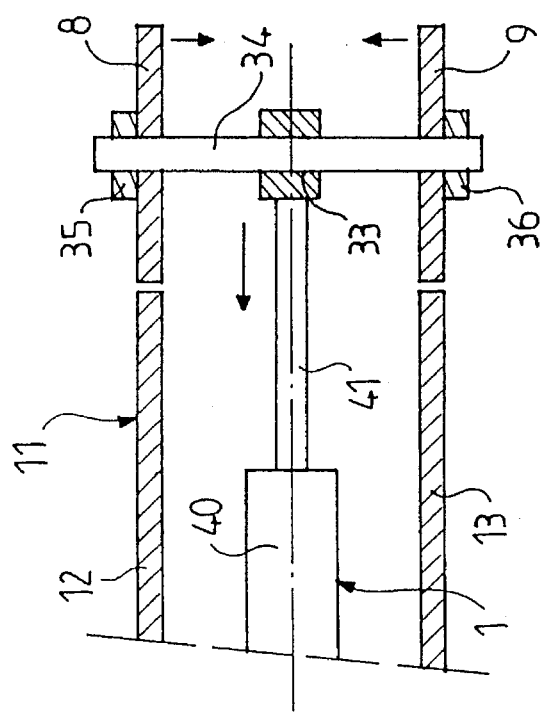
FIG. 9 is a partial sectional view of a modified embodiment of FIG. 6.

FIG. 9 shows another embodiment of the invention in which the energy-absorbing device has a hydraulic shock absorber 1 working in compression, this being arranged inside support 11. The body 40 of hydraulic shock absorber 1 is connected to the end of body-tube 10 facing the driver's wheel. The end of piston rod 41 of this hydraulic shock absorber 1 is provided with a passage hole 33 for a tubular part 34 mounted in each of the tightening brackets 8 and 9. This part 34 is fitted with a locking nut 35 and 36 at each of its threaded ends. Part 34 is therefore the intermediate part which, in the event of an impact, provides the supplemental tightening by its deformation in bending which brings tightening brackets 8 and 9 closer together.

As can be seen in FIGS. 6, 7 and 8, the energy-absorbing device of the invention can comprise a system for holding body-tube 10 in position comprising two tightening Vs 50 and 51. These two tightening Vs 50 and 51 are each arranged between the corresponding vertical member 12, 13, and body-tube 10. The two faces of these two Vs 50 and 51 bear against body-tube 10 in such a way that at the time a depth or inclination adjustment is made, each tightening V 50 and 51 follows the movement of body-tube 10 by sliding along bearing wall 52 and 53 of the corresponding tightening bracket 8 and 9.

This holding system comprises a system for angularly guiding each tightening V 50 and 51 in the corresponding vertical upright 12 and 13. This angular guide system is made up of pins 57 provided on, respectively, the outer faces 54, 55 of each of the tightening Vs 50 and 51. Each of these pins 57 penetrates and slides in a slot 58 and 59 provided respectively in the corresponding tightening bracket 8 and 9. Each of these slots is inclined with respect to the steering column, in such a way as to be substantially perpendicular to the trajectory of the driver's body at the time of an impact.

The V-clamp holding system also comprises a system to prevent body-tube 10 rotating about its axis. This anti-rotation system consists of a plate 64 which is fixed under body-tube 10 and comprises two wings 60 and 61 each parallel to one of the vertical members 12 and 13 or tightening brackets 8 and 9. These wings 60 and 61 are arranged in such a way that the distance separating their outer faces 62 and 63 is marginally smaller than the spacing of bearing walls 52 and 53 of tightening brackets 8 and 9. Wings 60 and 61 of plate 64 of the anti-rotation system are traversed by axis 3 of the locking system.

Another embodiment of the anti-rotation system is shown in FIG. 7, and consists of a central element 65 fixed under body-tube 10 and traversed by axis 3 of the locking system.

The operation of the energy-absorbing device of the invention concerns the adjustment of the column, and the case where there is an impact or "crash".

In the adjustment phase, the energy-absorbing device operates as a conventional bolt-nut tightening assembly. Displacement of operating device 4 moves the piston of shock absorber 1 under a small force as represented in zone a of FIG. 3. For the purposes of an example, the sliding force of the column when operating device 4 is tightened is in the order of 1000 Newtons in the axial direction and 500 Newtons in the angular direction. In addition, the displacement forces of operating device 4 are in the order of 50 Newtons.

The operation of the energy-absorbing device in the event of an impact is described below.

When the driver strikes the steering wheel, with or without air-bag, a force of approximately 4000 Newtons is induced at high speed along the steering wheel axis.

The resistance to sliding of the locking system being only 1000 Newtons, body-tube 10 of the steering column tends to slide in translation in support 11 and drives with it body 40 of hydraulic shock absorber 1.

Given the high displacement speed, the piston of hydraulic shock absorber 1 locks, i.e. the center-to-center distance between the fixturings of shock absorber 1 remains constant. In other words, the distance between articulation 42 and articulation 43 remains constant, articulation 42 being represented by point C in FIG. 4, articulation 43 by point A, and the locking axis by point B.

Due to the locking system, point B is fixed in translation, while point C undergoes a translation movement. As a result, point A pivots about point B causing the tightening of bolt 3 in proportion to the displacement in translation of point C. The tightening of bolt 3 increases the resistance of the locking system in proportion to the angle of rotation of bolt 3.

The locking system is therefore activated until the level of the force to be absorbed by hydraulic shock absorber 1 has been reached, i.e. until zone b in FIG. 3 is reached. Beyond this force, the piston starts to slide at a constant force up to the end of the adjustment distance of travel plus damping, i.e. in zone b of the curve in FIG. 3.

In one embodiment of the energy-absorbing device of the invention, the controlling force of operating device 4 is 50 Newtons, which with a lever arm of 70 mm gives a controlling torque of 3500 Newtons/mm. Due to the locking system, the resistance of the column is 1000 Newtons. In addition, the lever arm of link arm 2 is 15 mm, and the required resistance of the steering column 5500 Newtons. The force to be absorbed by hydraulic shock absorber 1 is therefore 3500/15×3500/100, or 1280 Newtons.

The energy-absorbing technique of the invention relating to an automobile vehicle steering column adjustable in depth and/or inclination, whose steering shaft is mounted in a body-tube 10 which is supported and locked to the vehicle body in the desired position, is implemented in the following phases:

the impact induces a force at high speed along the steering axis, with or without interposition of an air-bag, this force causes body-tube 10 to slide in support 11 fixed to the vehicle body via the depth adjustment system which works with the system that locks body-tube 10 in support 11, this force being greater than the tightening force provided by the system that locks said body-tube 10 in support 11, the damping system then moves, said system being made up of a hydraulic shock absorber connected at one end to body-tube 10, which effects the sliding, and at the other end to operating device 4 of the locking system acting by rotation about the locking axis, the operating device then turns in the locking direction due to the displacement of the damping system during the end of the distance of travel of the depth adjustment. During this displacement, the center-to-center distance of the ends of the shock absorber system remains substantially constant, the impact becomes greater than the force to be absorbed by the damping system, which then acts to travel the full distance of the energy-absorbing distance of travel.

The reference signs inserted after the technical characteristics mentioned in the claims serve only to facilitate comprehension of said claims, and in no way limit their scope.

We claim:

1. An energy-absorbing device for an automobile steering column adjustable in depth and inclination comprising:

a support structure fixed to the vehicle body for receiving an axially extending steering column body-tube and a steering shaft therein and mounting the body-tube and steering shaft to the vehicle body for selective depth and inclination adjustment;

a locking device for locking the body-tube in said support structure and including a rotatable elongate locking element mounted on the support structure and having an axis extending in a direction normal to the longitudinal axis of the steering column;

said locking device having an operator operable in a direction for rotating the locking element in a direction to increase tightening and locking of the body-tube in said support structure;

clamping elements mounted on said support structure coactive therewith and with said locking element for clamping the body-tube and locking it in said support structure;

said clamping elements and support structure having parts through which said locking element extends axially to accommodate positioning of the axis of the locking element in accordance with a selected depth and inclination of the steering column;

a damping device having a body mounted and connected at an end of the body-tube facing toward a driving wheel of the vehicle and translating therewith in response to an impact force applied to the body-tube at said end and in a direction parallel to the axis of the body-tube and effecting axial translation thereof;

an intermediate element coupling the damping device to the locking device operator for effecting rotation of the locking element about its axis in response to axial translation of the body-tube relative to said support structure to thereby preliminarily increase tightening of said body-tube in said support structure when the impact force is applied and if the impact force reaches a value of locking forces of the body-tube in said support structure said damping device is rendered effective and absorbs the energy of the impact force.

2. An energy-absorbing device according to claim 1, in which said damping device is mounted externally of the support structure.

3. An energy-absorbing device according to claim 1, in which said damping device comprises a hydraulic shock absorber.

4. An energy-absorbing device according to claim 1, in which said locking element is a tightening bolt, said clamping elements include two vertical tightening brackets on said support structure through which said tightening bolt extends axially, two reverse-pitch nuts mounted on respective threaded ends of the tightening bolt outwardly of the respective tightening brackets with respect to which they are locked in rotation, and said locking device operator is rigidly connected to one end of the tightening bolt.

5. An energy-absorbing device according to claim 1, in which said damping device comprises a hydraulic shock absorber having a piston rod extending therefrom and mountable for absorbing energy of compression forces, and said intermediate element connects the piston rod to said operator of the locking device.

6. An energy absorbing device according to claim 1, in which said support structure comprises two laterally spaced vertical bracket members, and said clamping elements comprise two clamping members between said vertical members each having an open V facing the body-tube and holding the body-tube therebetween for allowing depth adjustment of the body-tube on the surfaces of the two open V members, each vertical member having a vertical slot, each clamping member having a pin extending into a corresponding vertical slot for positioning of the two clamping members relative to the vertical members of the support structure for inclination adjustment of the body-tube.

7. An energy-absorbing device according to claim 6, in which-said body tube has an element fixed thereto extending downwardly from said body-tube, and said locking element extends therethrough for precluding rotation of the body-tube.

8. An energy-absorbing device according to claim 6, further including a plate mounted below the body-tube and having a recess into which the body-tube is disposed for precluding rotation thereof, said plate having two flanges disposed parallel to inner surfaces of the vertical bracket members, and said locking element comprises a bolt extending transversely through said flanges.

9. An energy-absorbing device for an automobile steering column adjustable in depth and inclination comprising:

a support structure fixed to the vehicle body for receiving an axially extending steering column body-tube and a steering shaft therein and mounting the body-tube and steering shaft to the vehicle body for selective depth and inclination adjustment;

a locking device for locking the body-tube in said support structure and including a rotatable elongate locking element rotatably mounted on the support structure and having an axis extending in a direction normal to the longitudinal axis of the steering column;

said locking device having an operator operable in a direction for rotating the locking element in a direction to increase tightening and locking of the body-tube in said support structure;

clamping elements mounted on said support structure coactive therewith and with said locking element for clamping the body-tube and locking it in said support structure;

said clamping elements and support structure having respective slots through which said locking element extends axially to accommodate positioning of the axis of the locking element in accordance with a selected depth and inclination of the steering column;

a damping device having a body mounted and connected at an end of the body-tube facing toward a driving wheel of the vehicle and translating therewith in response to an impact force applied to the body-tube at said end and in a direction parallel to the axis of the body-tube and effecting axial translation thereof;

an intermediate element coupling the damping device to the locking device operator for effecting rotation of the locking element about its axis in response to axial translation of the body-tube relative to said support structure to thereby preliminarily increase tightening of said body-tube in said support structure when the impact force is applied and if the impact force reaches a value of locking forces of the body-tube in said support structure said damping device is rendered effective and absorbs the energy of the impact force.

* * * * *